United States Patent [19]

Horst et al.

[11] Patent Number: 5,422,672
[45] Date of Patent: Jun. 6, 1995

[54] SYSTEM COMPRISISNG AT LEAST ONE ENCODER FOR CODING A DIGITAL SIGNAL AND AT LEAST ONE DECODER FOR DECODING A CODED DIGITAL SIGNAL, AND ENCODER AND DECODER FOR USE IN THE SYSTEM

[75] Inventors: Roel T. Horst, The Hague; Arian Koster, Mijdrecht; Karel J. Rijkse, Gouda; Dolf A. Schinkel, Hillegom, all of Netherlands

[73] Assignee: Koninklijke PTT Nederland N.V., Groningen, Netherlands

[21] Appl. No.: 27,852

[22] Filed: Mar. 8, 1993

[30] Foreign Application Priority Data

Mar. 17, 1992 [NL] Netherlands ............... 9200499

[51] Int. Cl.6 ............... H04N 7/133; H04N 7/137
[52] U.S. Cl. ............... 348/402; 348/413
[58] Field of Search ............... 348/400–402, 348/403, 413; H04V 7/133, 7/137

[56] References Cited

U.S. PATENT DOCUMENTS

| 4,723,161 | 2/1988 | Koga | 348/402 |
| 4,864,396 | 9/1989 | Martens | 348/411 |
| 4,941,042 | 7/1990 | Martens | 348/400 |

FOREIGN PATENT DOCUMENTS 0293041 11/1988 European Pat. Off. ..... H04N 7/137

OTHER PUBLICATIONS

"A Pyramid Image Coder Using Classified Transform Vector Quantization", S. Park et al, Jan. 22, 1991, pp. 25–41 of Signal Processing, European Journal.
Netherlands Search Report.

*Primary Examiner*—Howard W. Britton
*Attorney, Agent, or Firm*—Frishauf, Holtz, Goodman & Woodward

[57] ABSTRACT

An encoder for coding a digital signal comprises an encoder input for receiving the digital signal; a first data processor, having an input which is coupled to the encoder input, for generating a first coded digital signal at a first output of the first data processor; a first reduction device coupled to the encoder input, for reducing the received digital signal; a second data processor, having an input which is coupled to the first reduction device, for generating a second coded digital signal at a first output of the second data processor; a first encoder memory having an input which is coupled to a second output of the first data processor, and having an output which is coupled to the input of the first data processor; a second encoder memory having an input which is coupled to a second output of the second data processor, and having an output which is coupled to the input of the second data processor; and a first encoder prediction device having a first side which is coupled to the second output of the second data processor, and a second side which is coupled to both the input of the first encoder memory and the input of the first data processor. A decoder for decoding a digital signal which is encoded as described above, comprises a first data reprocessing device for processing a coded digital signal; and a decoder memory having an input which is coupled to an output of the first data reprocessing device.

9 Claims, 3 Drawing Sheets

SYSTEM COMPRISISNG AT LEAST ONE ENCODER FOR CODING A DIGITAL SIGNAL AND AT LEAST ONE DECODER FOR DECODING A CODED DIGITAL SIGNAL, AND ENCODER AND DECODER FOR USE IN THE SYSTEM

BACKGROUND OF THE INVENTION

The invention relates to a system comprising at least one encoder for coding a digital signal and at least one decoder for decoding a coded digital signal, which encoder is provided with an input for receiving the digital signal, first data processing means coupled with the input, for generating a first coded digital signal, reduction means coupled with the input, for reducing the received digital signal, second data processing means, coupled with the reduction means, for generating a second coded digital signal, and encoder prediction means for coupling the second data processing means with the first data processing means, and which decoder is provided with data reprocessing means for processing a coded digital signal.

A system of this type is disclosed by EP 0 293 041 A1, in particular by FIG. 6 (coding station) and FIG. 4 (decoding station) thereof. The television transmission system described therein comprises a coding station based on pyramidal coding (the encoder) and a decoding station based on pyramidal decoding (the decoder). The coding station is equipped with the input for receiving the digital signal to be coded, such as, for example, a television signal composed of picture elements (pixels or pels) and with the first data processing means, coupled with the input, for generating the first coded digital signal. The coding station is further equipped with the reduction means, coupled with the input, for reducing the digital signal received, with the second data processing means, coupled with the reduction means, for generating the second coded digital signal, and with the encoded prediction means for coupling the second data processing means with the first data processing means. Said first and second data processing means each comprise, for example, a series connection of a decimation circuit and a quantisation circuit. Such a system, provided with first and second data processing means, is, as it were, composed of two layers: the first data processing means generates the first coded digital signal, which has the highest resolution, because this signal is obtained by processing the received digital signal, and the second data processing means generates the second coded digital signal, which has the lowest resolution, because this signal is obtained by processing the received digital signal reduced by the reduction means. Both signals, via multiplexing and demultiplexing, are then transmitted to the decoding station which, in the case of decoding on the basis of high resolution, uses both signals and in the case of decoding on the basis of low resolution only uses the second coded digital signal. In its simplest form, the decoding station is equipped with the reprocessing means for processing the second coded digital signal, which comprises, for example, a series connection of an inverse quantisation circuit and an interpolation circuit. The simplicity of the decoding station, both in the case of decoding on the basis of high resolution and in the case of decoding on the basis of low resolution, is of considerable advantage in this system.

The known system has the drawback that it codes with insufficient efficiency.

SUMMARY OF THE INVENTION

The object of the invention is, inter alia, to provide a system of the type mentioned in the preamble, which codes with sufficient efficiency, and in which the decoder should remain simple in design.

To this end, the system mentioned in the preamble is characterised in that the encoder is provided with first encoder memory means for feeding back at least part of the first data processing means, second encoder memory means for feeding back at least part of the second data processing means, a first side of the encoder prediction means being coupled with the second encoder memory means, and a second side of the encoder prediction means being coupled with both an input of the first encoder memory means and an input of the first data processing means, and the decoder being provided with decoder memory means coupled with the data reprocessing means.

By feeding back, in the encoder, the first data processing means at least partially via the first encoder memory means, and by feeding back the second data processing means at least partially via the second encoder memory means, and by coupling, in the decoder, the data reprocessing means with the decoder memory means, a system is obtained which offers a considerably higher efficiency than the system of the type mentioned in the preamble. Coupling the first side of the encoder prediction means with the second encoder memory means, and of the second side of the encoder prediction means with both the input of the first encoder memory means and with the input of the first data processing means prevents the presence of so-called nested loops in the decoder which, as a result, remains simple in design.

The invention is based on the insight that the at least partial presence of the data processing means in a feedback loop via encoder memory means (which themselves are also often situated in a loop of their own) in the encoder leads to the presence of nested loops in the decoder, which as a result becomes complex in scope, and that coupling the encoder prediction means with two different points of the feedback loop in the encoder prevents said presence of nested loops in the decoder.

In a first embodiment, the system according to the invention is characterised in that the encoder is provided with first encoder motion prediction means, which are in series with the first encoder memory means, for generating a first vector signal, second encoder motion prediction means, which are in series with the second encoder memory means, for generating a second vector signal, the decoder being provided with decoder motion compensation means for feeding back the decoder memory means and for receiving a vector signal.

By placing, in the encoder, the first encoder motion prediction means in series with the first encoder memory means, and placing the second encoder motion prediction means in series with the second encoder memory means, and by feeding back, in the decoder, the decoder memory means via the decoder motion compensation means, a system is obtained which codes with yet higher efficiency, because this system, in coding and decoding different picture elements, takes into account any motions of the picture contents. Both vector signals are transmitted, via multiplexing and demultiplexing, to the decoder in which one of the vector signals or a combination of two vector signals is used for controlling the decoder motion compensation means. A further improvement could be obtained by providing the encoder motion prediction means with filtering means, which reduces the influence of coding errors and which lowers the quantisation noise in the feedback loop.

In a second embodiment, the system according to the invention is characterised in that the decoder is provided with further data reprocessing means for processing a further coded digital signal, decoder prediction means coupled with the data reprocessing means and combining means coupled with the further data reprocessing means and with the decoder prediction means, for coupling the further data reprocessing means and the decoder prediction means with the decoder memory means.

By providing the decoder with the further data reprocessing means for processing the further coded digital signal and by placing the decoder prediction means in series with the data reprocessing means and by coupling the further data reprocessing means and the decoder prediction means via the combining means with the decoder memory means, a system is obtained in which the decoder is able to decode on the basis of high resolution. In this case, the data reprocessing means processes the second coded digital signal and the further data reprocessing means processes the first coded digital signal.

In a third embodiment, the system according to the invention is characterised in that the encoder is provided with further reduction means coupled with the reduction means, for reducing further the received digital signal, third data processing means coupled with the further reduction means, for generating a third coded digital signal, third encoder memory means for feeding back at least part of the third data processing means, third encoder motion prediction means, which is in series with the third encoder memory means, for generating a third vector signal, further encoder prediction means for coupling the third data processing means with the second data processing means, a first side of the further encoder prediction means being coupled with the third encoder memory means, and a second side of the further encoder prediction means being coupled with both an input of the second encoder memory means and with an input of the second data processing means, the decoder being provided with subsequent data reprocessing means for processing a subsequent coded digital signal, subsequent decoder prediction means coupled with the subsequent data reprocessing means and subsequent combining means, which is situated between the data reprocessing means and the decoder prediction means, for coupling the data reprocessing means and the subsequent decoder prediction means with the decoder prediction means.

By providing the encoder with the further reduction means coupled with the reduction means and the third data processing means coupled therewith for generating the third coded digital signal, which is fed back, at least in part, via the third encoder memory means and the third encoder motion prediction means placed in series therewith, and by providing the encoder with the further encoder prediction means, of which the first side is coupled with the third encoder memory means and of which the second side is coupled with both the input of the second encoder memory means and with the input of the second data processing means, a system is obtained in which the encoder is composed of three layers: the first data processing means generates the first coded digital signal which has the highest resolution, because this signal is obtained by processing the received digital signal, the third data reduction means generates the third coded digital signal which has the lowest resolution, because this signal is obtained by processing the received digital signal reduced by the reduction means and further reduced by the further reduction means, and the second data reduction means generates the second coded digital signal which has an intermediate resolution, because this signal is obtained by processing the received digital signal reduced by the reduction means. In order to be able to decode on the basis of the highest resolution, the decoder is in this case provided with subsequent data processing means for processing the subsequent coded digital signal, and the subsequent decoder prediction means are placed in series with the subsequent data reprocessing means, which subsequent decoder prediction means together with the data reprocessing means are coupled, via the subsequent combining means, with the decoder prediction means. In this case, the subsequent data reprocessing means processes the third coded digital signal.

In a fourth embodiment, the system according to the invention is characterised in that the data processing means each comprises a series connection of transforming means, quantising means and coding means, and comprises a series connection, which is coupled with a branch point located between the quantising means and the coding means, of inverse quantising means and inverse transforming means for feeding back, the reduction means each comprising filtering means and subsampling means, the encoder prediction means each comprising interpolating means and upsampling means, the data reprocessing means each comprising a series connection of inverse coding means, inverse quantising means and inverse transforming means, and the decoder prediction means each comprising interpolating means and upsampling means.

In the data processing means, the transforming means performs, for example, a discrete cosine transform on a presented digital signal. The quantising means performs a quantisation on the signal thus obtained, and the quantised signal is coded by the coding means, for example on the basis of a two-dimensional table, by means of which new code words are generated which, on average, have a shorter length than the input words (compression). The at least partial feedback of the data processing means takes place via the series connection, coupled with the branch point, of the inverse quantising means which performs an inverse quantisation, and the inverse transforming means which, for example, performs an inverse discrete cosine transform. In the reduction means, the filtering means filters a presented signal in order to prevent or reduce folding crosstalk, and the subsampling means deals with downward sampling, as a result of which a lowering of the resolution is achieved. In the encoder prediction means and the decoder prediction means, the interpolating means interpolates a presented signal, and the upsampling means deals with upward sampling, whereby, via both the last-mentioned means, the signal presented thereto can be coupled with a signal having a higher resolution. In the data reprocessing means, the inverse coding means deals with the inverse coding, for example on the basis of a table, of a presented signal. The inverse quantising means subsequently performs an inverse quantisation, and the inverse transforming means, for example, again performs an inverse discrete cosine transform. Obviously, many variations are possible in this implementation. Thus, the data processing means can also processes, for example, data on the basis of the so-called subband splitting, of DPCM (differential pulse code modulation) in the prediction error or of VQ (vector quantisation), and many other (compressing) codings are conceivable.

The invention further relates to an encoder for use in the system according to the invention. Such an encoder is provided with an input for receiving the digital signal,
first data processing means coupled with the input, for generating a first coded digital signal,
reduction means coupled with the input, for reducing the received digital signal,
second data processing means, coupled with the reduction means, for generating a second coded digital signal and,
encoder prediction means for coupling the second data processing means with the first data processing means.

The encoder according to the invention is characterised in that the encoder is provided with
first encoder memory means for feeding back at least part of the first data processing means,
second encoder memory means for feeding back at least part of the second data processing means,
a first side of the encoder prediction means being coupled with the second encoder memory means, and a second side of the encoder prediction means being coupled with both an input of the first encoder memory means and with an input of the first data processing means.

In a first embodiment, the encoder is characterised in that the encoder is provided with
first encoder motion prediction means, which is in series with the first encoder memory means, for generating a first vector signal,
second encoder motion prediction means, which are in series with the second encoder memory means, for generating a second vector signal.

In a second embodiment, the encoder is characterised in that the encoder is provided with
further reduction means coupled with the reduction means, for reducing further the received digital signal,
third data processing means coupled with the further reduction means, for generating a third coded digital signal,
third encoder memory means for feeding back at least part of the third data processing means,
third encoder motion prediction means, which is in series with the third encoder memory means, for generating a third vector signal,
further encoder prediction means for coupling the third data processing means with the second data processing means, a first side of the further encoder prediction means being coupled with the third encoder memory means, and a second side of the further encoder prediction means being coupled with both an input of the second encoder memory means and with an input of the second data processing means.

In a third embodiment, the encoder is characterised in that the data processing means each comprises a series connection of transforming means, quantising means and coding means, and comprises a series connection, which is coupled with a branch point located between the quantising means and the coding means, of inverse quantising means and inverse transforming means for feeding back, the reduction means each comprising filtering means and subsampling means, and the encoder prediction means each comprising interpolating means and upsampling means.

The invention yet further relates to a decoder for use in the system according to the invention. Such a decoder is provided with
data reprocessing means for processing a coded digital signal.

The decoder according to the invention is characterised in that the decoder is provided with
decoder memory means coupled with the data reprocessing means.

In a first embodiment, the decoder is characterised in that the decoder is provided with
decoder and motion compensation means for feeding back the decoder memory means for receiving a vector signal.

In a second embodiment, the decoder is characterised in that the decoder is provided with
further data reprocessing means for processing a further coded digital signal,
decoder prediction means coupled with the data reprocessing means and
combining means coupled with the further data reprocessing means and with the decoder prediction means, for coupling the further data reprocessing means and the decoder prediction means with the decoder memory means.

In a third embodiment, the decoder is characterised in that the decoder is provided with
subsequent data reprocessing means for processing a subsequent coded digital signal,
subsequent decoder prediction means coupled with the subsequent data reprocessing means and
subsequent combining means, which is situated between the data reprocessing means and the decoder prediction means, for coupling the data reprocessing means and the subsequent decoder prediction means with the decoder prediction means.

In a fourth embodiment, the decoder is characterised in that the data reprocessing means each comprises a series connection of inverse coding means, inverse quantising means and inverse transforming means, the decoder prediction means each comprising interpolating means and upsampling means.

It is pointed out that feedback of the data processing means of an encoder consisting of one layer is a technique known per se for making such an encoder code more efficiently (see for example "Description of reference model 8" (RM 8), CCITT SGXV, document 525, 1989). From this, however, it is not known to feedback, in a pyramidal system in which the encoder is composed from various layers, the data processing means in each layer and to mutually couple, at the same time, the data processing means of two adjacent layers via encoder prediction means, the latter being connected in the highest of the two layers with two different points of the feedback loop in order to keep simple the design of the decoder.

REFERENCES

EP 0 293 041 A1
"Description of reference model 8" (RM8)
CCITT SGXV, working party XV/4,
Specialists group on coding for visual telephony, document 525, 1989

BRIEF DESCRIPTION OF THE DRAWINGS

The invention will be explained in more detail with reference to illustrative embodiments depicted in the figures, in which.

DETAILED DESCRIPTIONS

Figure 1:
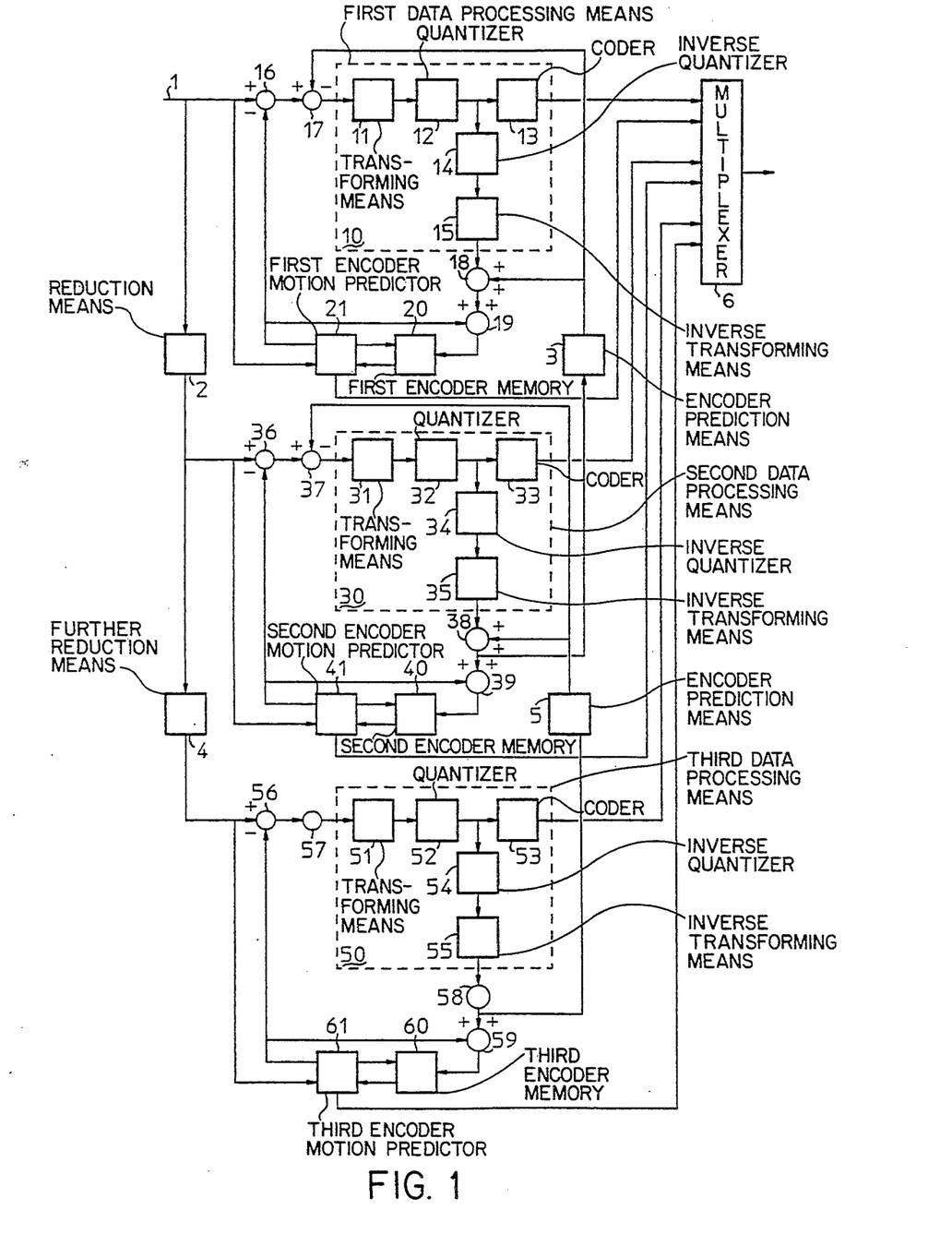
FIG. 1 shows an encoder according to the invention for use in a system according to the invention.

The encoder depicted in FIG. 1 is composed of three layers. The first layer (10-21) codes signals on the basis of the highest resolution, the third layer codes signals on the basis of the lowest resolution (50-61) and the second layer (30-41) codes signals on the basis of an intermediate resolution.

The first layer comprises first data processing means 10, which is composed of a series connection of transforming means 11, quantising means 12 and coding means 13 and of a series connection, coupled with a branch point located between the quantising means 12 and coding means 13, of inverse quantising means 14 and inverse transforming means 15. An input of transforming means 11 forms an input of data processing means 10, which is coupled with an output of subtraction circuit 17. An output of coding means 13 forms a coding output of data processing means 10 for generating a first coded digital signal on the basis of the highest resolution, which coding output is coupled with a first input of a multiplexer 6. An output of inverse transforming means 15 forms a feedback output of data processing means 10 for the (at least partial) feedback of said data processing means 10, which feedback output is coupled with a first (plus) input of addition circuit 18. An output of addition circuit 18 is coupled with a first (plus) input of addition circuit 19, of which an output is coupled with an input of first encoder memory means 20. These are coupled bidirectionally with first encoder motion prediction means 21, of which a vector output for generating a first vector signal is coupled with a second input of multiplexer 6. An input of encoder motion prediction means 21 is coupled with an input 1 of the encoder, which input 1 is further coupled with a first (plus) input of subtraction circuit 16. An output thereof is coupled with a first (plus) input of subtraction circuit 17, and a second (minus) input is coupled with a further output of encoder motion prediction means 21, which further output is further coupled with a second (plus) input of addition circuit 19.

The second layer comprises second data processing means 30, which is composed of a series connection of transforming means 31, quantising means 32 and coding means 33 and of a series connection, coupled with a branch point located between the quantising means 32 and coding means 33, of inverse quantising means 34 and inverse transforming means 35. An input of transforming means 31 forms an input of data processing means 30, which is coupled with an output of subtraction circuit 37. An output of coding means 33 forms a coding output of data processing means 30 for generating a second coded digital signal on the basis of the intermediate resolution, which coding output is coupled with a third input of multiplexer 6. An output of inverse transforming means 35 forms a feedback output of data processing means 30 for the (at least partial) feedback of said data processing means 30, which feedback output is coupled with a first (plus) input of addition circuit 38. An output of addition circuit 38 is coupled with a first (plus) input of addition circuit 39, of which an output is coupled with an input of second encoder memory means 40. These are coupled bidirectionally with second encoder motion prediction means 41, of which a vector output for generating a second vector signal is coupled with a fourth input of multiplexer 6. An input of encoder motion prediction means 41 is coupled with an output of reduction means 2 for reducing the received signal, which output is further coupled with a first (plus) input of subtraction circuit 36. An output thereof is coupled with a first (plus) input of subtraction circuit 37, and a second (minus) input is coupled with a further output of encoder motion prediction means 41, which further output is further coupled with a second (plus) input of addition circuit 39. Reduction means 2, of which an input is coupled with the input 1 of the encoder, comprises filtering means and subsampling means. The output of addition circuit 38 is further coupled with an input of encoder prediction means 3 for coupling data processing means 30 with data processing means 10. An output of encoder prediction means 3 is coupled with both a (plus) input of addition circuit 18 and with a (minus) input of subtraction circuit 17. In this context, the input of encoder prediction means 3 forms a first side which is coupled with encoder memory means 40 (via addition circuit 39), and the output of encoder prediction means 3 forms a second side which is coupled both with the input of encoder memory means 20 (via addition circuits 18, 19) and with the input of data processing means 10 (via subtraction circuit 17). Encoder prediction means 3 comprises interpolating means and upsampling means.

The third layer comprises third data processing means 50, which is composed of a series connection of transforming means 51, quantising means 52 and coding means 53 and of a series connection, coupled with a branch point located between the quantising means 52 and coding means 53, of inverse quantising means 54 and inverse transforming means 55. An input of transforming means 51 forms an input of data processing means 50, which is coupled with an output of subtraction circuit 57. An output of coding means 53 forms a coding output of data processing means 50 for generating a third coded digital signal on the basis of the lowest resolution, which coding output is coupled with a fifth input of multiplexer 6. An output of inverse transforming means 55 forms a feedback output of data processing means 50 for the (at least partial) feedback of said data processing means 50, which feedback output is coupled with a first (plus) input of addition circuit 58. An output of addition circuit 58 is coupled with a first (plus) input of addition circuit 59, of which an output is coupled with an input of third encoder memory means 60. These are coupled bidirectionally with third encoder motion prediction means 61, of which a vector output for generating a third vector signal is coupled with a sixth input of multiplexer 6. An input of encoder motion prediction means 61 is coupled with an output of further reduction means 4 for further reducing the received signal already reduced by reduction means 2, which output is further coupled with a first (plus) input of subtraction circuit 56. An output thereof is coupled with a first (plus) input of subtraction circuit 57, and a second (minus) input is coupled with a further output of encoder motion prediction means 61, which further output is further coupled with a second (plus) input of addition circuit 59. Reduction means 4, of which an input is coupled with the output of reduction means 2, comprises filtering means and subsampling means. The output of addition circuit 58 is further coupled with an input of further encoder prediction means 5 for coupling data processing means 50 with data processing means 30. An output of encoder prediction means 5 is coupled with both a (plus) input of addition circuit 38 and with a (minus) input of subtraction circuit 37. In this context, the input of encoder prediction means 5 forms a first side which is coupled with encoder memory means 60 (via addition circuit 59), and the output of encoder prediction means 5 forms a second side which is coupled both with the input of encoder memory means 40 (via addition circuits 38, 39) and with the input of data processing means 30 (via subtraction circuit 37). Encoder prediction means 5 comprises interpolating means and upsampling means.

The encoder depicted in FIG. 1 works as follows. The digital signal to be coded is presented as a bit stream to input 1, a predefined number of bits in each case forming a picture element (pixel or pel). Assuming that the contents of encoder memory means 20 are empty, a first group of pels reaches the data processing means 10 via subtraction circuit 16 and subtraction circuit 17. The transforming means 11, for example, performs a discrete cosine transform on the group of pels, by means of which the associated coefficient is determined for each frequency component. The quantising means 12 quantises the obtained signal. The quantised signal is subsequently coded by coding means 13, for example on the basis of a two-dimensional table, by means of which new code words are generated which, on average, have a shorter length than the input words, and are fed to multiplexer 6. Said transformed, quantised and coded first group of pels thus forms the first part of the signal coded on the basis of the highest resolution. After having been tranformed (sic) and quantised, the first group of pels is inversely quantised by inverse quantising means 14 and is inversely transformed by inverse transforming means 15 and is stored, via addition circuit 18 and addition circuit 19, in encoder memory means 20 in a first location. A second group of pels covers the same route as the first group of pels, undergoes the same processes and is stored in encoder memory means 20 in a second location, etc. until all the groups of pels of one complete picture (the first picture) have been stored.

The first group of pels of the subsequent (second) picture is subsequently presented to input 1 and fed to encoder motion prediction means 21 which, on the basis of the previous (first) picture stored in encoder memory means 20, checks whether there is a case of a particular motion. If that is so, said motion, in the form of the first vector signal, is fed to multiplexer 6. At the same time, encoder memory means 20 generates the first group of pels of the previous (first) picture, which first group of pels, via encoder motion prediction means 21, is subtracted from the first group of pels of the (second) picture to be coded, via subtraction circuit 16. As a result of the difference between the first group of pels of the second picture and the first group of pels of the first picture subsequently being presented to data processing means 10, coding proceeds considerably more efficiently. Taking account, by means of the encoder motion prediction means, of possible motions in the picture contents of consecutive pictures increases the efficiency yet further. Instead of vectors, it is obviously also possible to transmit other prediction parameters which have been determined on the basis of other prediction methods.

What has been described above is the mode of operation of the encoder with regard to the first layer built around data processing means 10. The mode of operation with regard to the second layer built around data processing means 30, and with regard to the third layer built around data processing means 50 is in principle identical, apart from the following.

Data processing means 30, via subtraction circuit 36 and subtraction circuit 37, are fed with the received signal, which has been reduced via reduction means 2 and which, with respect to the signal presented at input 1, has a lower resolution as a consequence of filtering and subsampling. The coded signal generated by data processing means 30 as a result has been coded on the basis of a lower resolution (the intermediate resolution). Data processing means 50, via subtraction circuit 56 and subtraction circuit 57, are fed with the received signal, which has been reduced via reduction means 2 and further reduced via reduction means 4 and which, as a consequence of filtering twice and subsampling twice, has a yet lower resolution. The coded signal generated by data processing means 50, as a result, has been coded on the basis of a yet lower resolution (the lowest resolution).

Coupling the third layer with the second layer via encoder prediction means 5 raises the efficiency of data processing means 30, because a group of pels, which has been coarsely coded in the third layer, only needs to be coded more finely in the second layer. Interpolating and upsampling by encoder prediction means 5 is necessary because of the different resolution levels between the two layers.

Coupling the second layer with the first layer via encoder prediction means 3 raises the efficiency of data processing means 10, because a group of pels, which has been coarsely coded in the third layer and more finely in the second layer, only needs to be coded yet more finely in the first layer. Interpolating and upsampling by encoder prediction means 3 is necessary because of the different resolution levels between the two layers.

Coupling the output of encoder prediction means 5 with both addition circuit 38 and subtraction circuit 37, and of the output of encoder prediction means 3 with both addition circuit 18 and with subtraction circuit 17 prevents the presence of nested loops in the decoder to be dealt with later, as a result of which the design of the latter remains simple.

In those cases where coupling between encoder prediction means 3 and both addition circuit 18 and subtraction circuit 17 and between encoder prediction means 5 and both addition circuit 38 and subtraction circuit 37 does not result in more efficient coding, a decision can be made to interrupt temporarily such a coupling for a particular group of pels.

Of the addition circuit 58 and subtraction circuit 57 present in the third layer, only the first inputs are used. In the case of a fourth layer being present, the fourth data processing means associated therewith will be coupled via other encoder prediction means with the second inputs of addition circuit 58 and subtraction circuit 57. The encoder should, as a minimum, be equipped with two layers, in which case the coded signal having the highest resolution is, for example, suitable for displaying so-called high-definition television pictures, and the coded signal having the lowest resolution is suitable for displaying ordinary television pictures. If the encoder is equipped with three layers, it would be possible to use the third layer for coding signals for displaying, for example, pictures of a so-called videophone.

Figure 2:
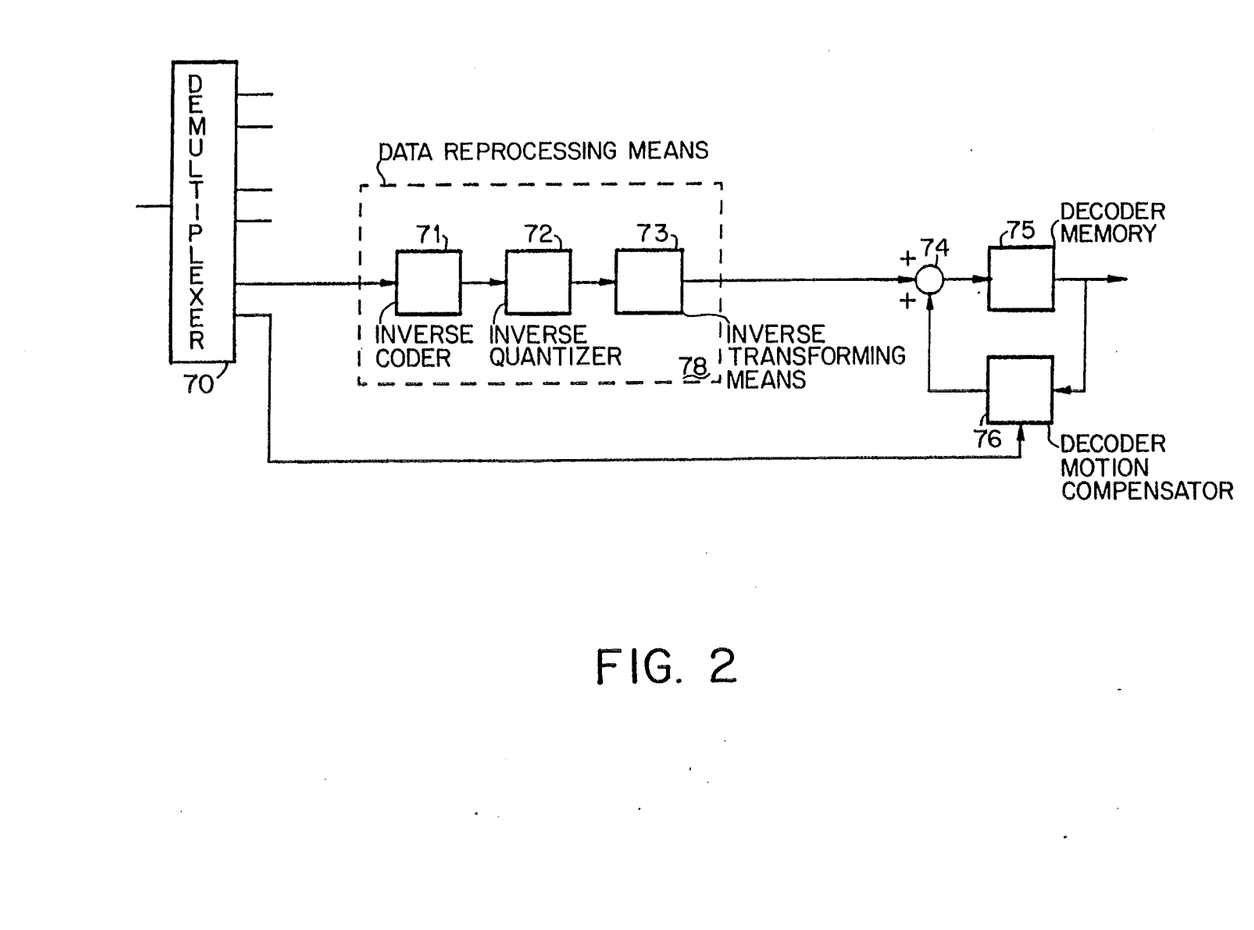
FIG. 2 shows a decoder according to the invention for use in a system according to the invention for decoding a coded signal on the basis of the lowest resolution.

The decoder depicted in FIG. 2 comprises a demultiplexer 70 with an input for receiving the multiplexed signal, which originates from the encoder and which comprises at least the third coded digital signal, which has the lowest resolution, and the third vector signal. The third coded digital signal appears on a first output of demultiplexer 70, and the third vector signals appear on a second output of demultiplexer 70. The first output is coupled with an input of data reprocessing means 78, which comprise a series connection of inverse coding means 71, inverse quantisation means 72 and inverse transforming means 73, and of which an output is coupled with a first input of addition circuit 74. An output of addition circuit 74 is coupled with an input of decoder memory means 75, and an output of the latter forms an output of the decoder and is coupled with an input of decoder motion compensation means 76. An output thereof is coupled with a second input of addition circuit 74, and a vector input is coupled with the second output of demultiplexer 70 for receiving the (third) vector signal.

The mode of operation of the decoder depicted in FIG. 2 is as follows. Data reprocessing means 78 performs an inverse coding, via inverse coding means 71, on the third coded digital signal, for example on the basis of a table, subsequently performs, via inverse quantising means 72, an inverse quantisation and thereafter, via inverse transforming means 73, performs an inverse transform, for example an inverse discrete cosine transform. A signal is thus obtained which is the difference between a particular group of pels of a particular picture and a particular group of pels of a picture preceding it. With the aid of the decoder memory means 75 fed back via the decoder motion compensation means 76, the particular group of pels of the particular picture then appears on the output of the decoder. If during coding account has been taken of motions in the picture contents of consecutive pictures, this is compensated, in response to the third vector signal, by the decoder motion compensation means 76. If no account need be taken of motions, then the decoder motion compensation means 76 should still be present for feedback of the decoder memory means 75, or else another feedback should be present for the purpose of the decoder memory means 75, since the latter is otherwise unable to convert the presented difference signal into a signal which is directly representative for a picture or a part thereof.

Figure 3:
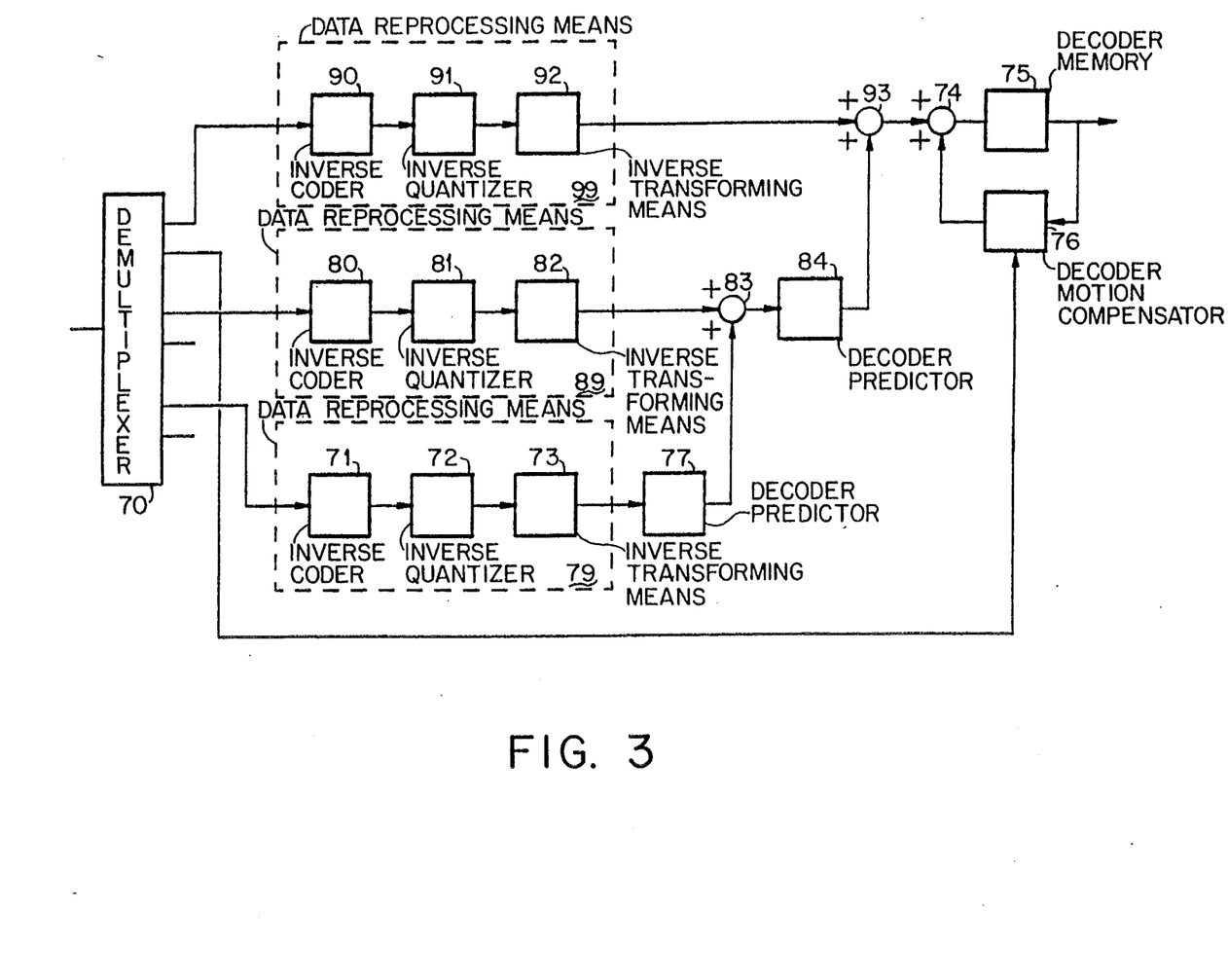
FIG. 3 shows a decoder according to the invention for use in a system according to the invention for decoding a coded signal on the basis of the highest resolution.

The decoder depicted in FIG. 3 comprises a demultiplexer 70 with an input for receiving the multiplexed signal originating from the encoder, which signal comprises the third coded digital signal having the lowest resolution, the third vector signal, the second coded digital signal having the intermediate resolution, the second vector signal, the first coded digital signal having the highest resolution, and the first vector signal. The third coded digital signal appears on a first output of demultiplexer 70, the third vector signal appears on a second output of demultiplexer 70, the second coded digital signal appears on a third output of demultiplexer 70, the second vector signal appears on a fourth output of demultiplexer 70, the first coded digital signal appears on a fifth output of demultiplexer 70, and the first vector signal appears on a sixth output of demultiplexer 70. The first output is coupled with an input of subsequent data reprocessing means 79, which comprise a series connection of inverse coding means 71, inverse quantising means 72 and inverse transforming means 73, and of which an output is coupled, via subsequent decoder prediction means 77, with a second input of subsequent combining means 83. Subsequent decoder prediction means 77 comprises interpolating means and upsampling means. The third output is coupled with an input of data reprocessing means 89, which comprises a series connection of inverse coding means 80, inverse quantising means 81 and inverse transforming means 82, and of which an output is coupled with a first input of subsequent combining means 83. An output thereof is coupled, via decoder prediction means 84 comprising interpolating means and upsampling means, with a second input of combining means 93. The fifth output is coupled with an input of further data reprocessing means 99, which comprise a series connection of inverse coding means 90, inverse quantising means 91 and inverse transforming means 92, and of which an output is coupled with a first input of combining means 93. An output thereof is coupled with a first input of addition circuit 74. An output of addition circuit 74 is coupled with an input of decoder memory means 75, and an output of the latter forms an output of the decoder and is coupled with an input of decoder motion compensation means 76. An output thereof is coupled with a second input of addition circuit 74, and a vector input is coupled with the sixth output of demultiplexer 70 for receiving the (first) vector signal.

The mode of operation of the decoder depicted in FIG. 3 is as follows. Data reprocessing means 79, via inverse coding means 71, performs an inverse coding on the third coded digital signal, for example on the basis of a table, subsequently performs, via inverse quantising means 72, an inverse quantisation and thereafter, via inverse transforming means 73, performs an inverse transform, for example an inverse discrete cosine transform. Data reprocessing means 89, via inverse coding means 80, performs an inverse coding on the second coded digital signal, for example on the basis of a table, subsequently performs, via inverse quantising means 81, an inverse quantisation and thereafter performs, via inverse transforming means 82, an inverse transform, for example an inverse discrete cosine transform. Data reprocessing means 99 performs, via inverse coding means 90, an inverse coding on the second coded digital signal, for example on the basis of a table, subsequently performs, via inverse quantising means 91, an inverse quantisation and thereafter performs, via inverse transforming means 92, an inverse transform, for example an inverse discrete cosine transform. The signal generated by data reprocessing means 79 has the lowest resolution and, as a result, is interpolated with the aid of decoder prediction means 77 and upsampled, whereafter it is suitable to be added, via combining means 83, to the signal generated by data reprocessing means 89. The sum signal thus obtained has the intermediate resolution and is interpolated and upsampled with the aid of decoder prediction means 84, whereafter it is suitable to be added, via combining means 93, to the signal generated by data reprocessing means 99. The signal thus obtained has the highest resolution and forms the difference between a particular group of pels of a particular picture and a particular group of pels of a picture preceding it. With the aid of the decoder memory means 75 fed back via the decoder motion compensation means 76, the particular group of pels of the particular picture subsequently appears on the output of the decoder. If account has been taken, during coding, of motions in the picture contents of consecutive pictures, this is compensated, in response to the first vector signal (or for example a combination of the first and second and possibly third vector signal), by the decoder motion compensation means 76.

The use of multiplexer 6 and demultiplexer 70 is, of course, only an embodiment. Thus it is conceivable, for example in video recorders, that the transfer of the signals from the encoder to the decoder takes place via ordinary individual connections, and in addition there are methods other than multiplexing and demultiplexing, by means of which different signals can likewise be transferred (such as modulation and demodulation techniques).

The decoder is equipped, as a minimum, with one layer having data reprocessing means if decoding at the lowest level is required, and with two layers (each layer having data reprocessing means) if decoding at the lowest but one level is required, etc. If the decoder is equipped with the same number of layers as the encoder, decoding is possible at the highest level. Obviously it is also possible, with a decoder composed of different layers, to decode optionally at the lowest level or at a higher level, which can be implemented by making or breaking, via switches, particular connections in the decoder.

What is claimed is:

1. An encoder for coding a digital signal, said encoder comprising:
   an encoder input for receiving the digital signal;
   first data processing means, having an input which is coupled to the encoder input, for generating a first coded digital signal at a first output of the first data processing means;
   first reduction means coupled to the encoder input, for reducing the received digital signal;
   second data processing means, having an input which is coupled to the first reduction means, for generating a second coded digital signal at a first output of the second data processing means;
   a first encoder memory having an input which is coupled to a second output of the first data processing means, and having an output which is coupled to the input of the first data processing means;
   a second encoder memory having an input which is coupled to a second output of the second data processing means, and having an output which is coupled to the input of the second data processing means; and
   first encoder prediction means having a first side which is coupled to the second output of the second data processing means, and a second side which is coupled to both the input of the first encoder memory and the input of the first data processing means.

2. The encoder of claim 1, further comprising:
   first encoder motion prediction means, coupled between the output of the first encoder memory and the input of the first data processing means, for generating a first vector signal; and
   second encoder motion prediction means, coupled between the output of the second encoder memory and the input of the second data processing means, for generating a second vector signal.

3. The encoder of claim 2, further comprising:
   second reduction means coupled with the first reduction means, for further reducing the received digital signal;
   third data processing means, having an input which is coupled to the second reduction means, for generating a third coded digital signal at a first output of the third data processing means;
   a third encoder memory having an input which is coupled to a second output of the third data processing means, and having an output which is coupled to the input of the third data processing means;
   third encoder motion prediction means, coupled between the output of the third encoder memory and the input of the third data processing means, for generating a third vector signal; and
   second encoder prediction means having a first side which is coupled to the second output of the third data processing means and a second side which is coupled to both the input of the second encoder memory and the input of the second data processing means.

4. The encoder of claim 3, wherein:
   each data processing means comprises:
     a series connection of transforming means, quantizing means and coding means, and
     a series connection, which is coupled with a branch point located between the quantizing means and the coding means, of inverse quantizing means and inverse transforming means for feeding back a signal to the input of the respective said data processing means,
   each said reduction means comprising filtering means and subsampling means, and
   each said encoder prediction means comprising interpolating means and upsampling means.

5. A decoder for decoding a digital signal, for use in combination with the encoder of claim 1, the decoder comprising:
   first data reprocessing means for processing a coded digital signal; and
   a decoder memory having an input which is coupled to an output of the first data reprocessing means.

6. The decoder of claim 5, further comprising:

first decoder motion compensation means for receiving a vector signal, said decoder motion compensation means having an input which is coupled to an output of the decoder memory and an output which is coupled to the input of the decoder memory.

7. The decoder of claim 6, further comprising:
second data reprocessing means for processing a second coded digital signal;
first decoder prediction means coupled between the first data reprocessing means and the decoder memory; and
first combining means having a first input which is coupled to an output of the second data reprocessing means and a second input which is coupled to an output of the first decoder prediction means, and an output which is coupled to the input of the decoder memory.

8. The decoder of claim 7, further comprising:
third data reprocessing means for processing a third coded digital signal;
second decoder prediction means having an input coupled with an output of the third data reprocessing means; and
second combining means having a first input which is coupled to the output of the first data reprocessing means and a second input which is coupled to an output of the second decoder prediction means, and an output which is coupled to an input of the first decoder prediction means.

9. The decoder of claim 8, wherein each said data reprocessing means comprises a series connection of inverse coding means, inverse quantizing means and inverse transforming means, and each said decoder prediction means comprises interpolating means and upsampling means.

* * * * *